Oct. 13, 1970 S. BLOOM 3,533,164
NAVIGATION AID FOR PLOTTING
Filed Dec. 6, 1967

INVENTOR
SIDNEY BLOOM

ATTORNEY

United States Patent Office 3,533,164
Patented Oct. 13, 1970

3,533,164
NAVIGATION AID FOR PLOTTING
Sidney Bloom, Silver Spring, Md., assignor of one-fourth to William Britton Moore, Sherwood Forest, Md.
Filed Dec. 6, 1967, Ser. No. 688,567
Int. Cl. G01b 3/14
U.S. Cl. 33—1
1 Claim

ABSTRACT OF THE DISCLOSURE

A navigation aid apparatus and method for plotting a positional fix on a chart arranged on a plotting board which includes spring wound spools with cords wound thereon and having board attaching means on the ends thereof so that the ends of the cords may be unwound from the spools and attached to the chart at the points of reception of directional radio beams whereby their point of intersection indicates the vehicle's position on the chart.

---

This invention relates to a navigation aid apparatus and method and more particularly to a plotting device for determining the position of an aircraft, or other moving vehicle.

It is well known in navigation to obtain a position fix on a chart by the triangulation method wherein the directional reception of signals from two or more radio stations are plotted on the chart. Known methods for accomplishing this function, however, have involved either the use of numerous pencil lines on the chart, or a rather complicated and expensive protractor mechanism, both of which are impractical for use by a single pilot-navigator.

An object of the present invention, therefore, is the provision of a simple and relatively inexpensive device and method for plotting a position fix on a chart in a moving vehicle.

A further object is to provide a position plotting device which may be readily self-operated by a pilot and does not necessitate inscribing markings on a chart.

Still another object is the provision of a plotting device that may be repeatedly used with a chart without requiring the use of awkward drafting instruments so that the pilot-navigator may readily determine the vehicle's exact position.

These and other objects, features and advantages of the invention will be apparent from the following specification when considered with the accompanying drawing which illustrates an embodiment of the invention wherein FIG. 1 is a view illustrating a preferred form of the plotting device;

Figure 1:
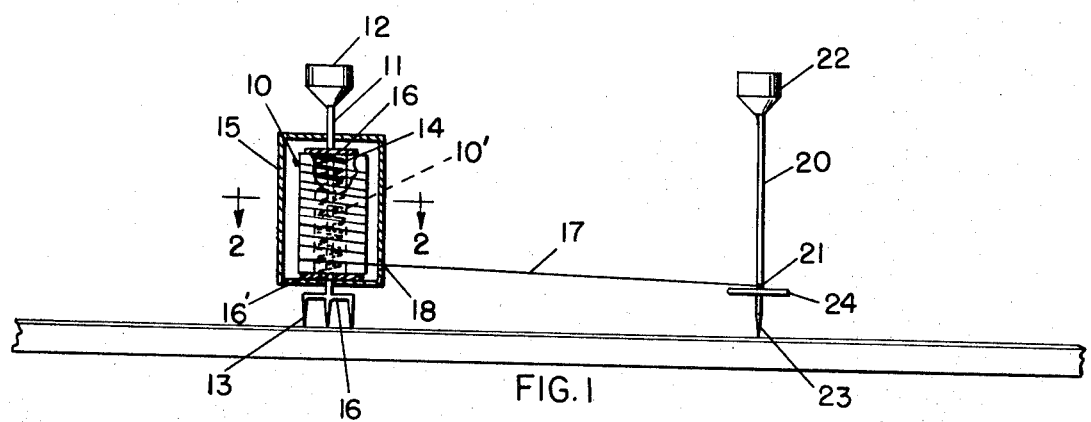
Figure 2:
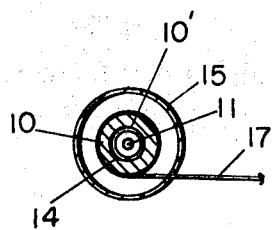
FIG. 2 is a cross-sectional view taken on the line 2—2 of FIG. 1.

Referring more particularly to the drawings, wherein similar reference characters designate like parts throughout the several views, and specifically to FIGS. 1 and 2, a spool 10 of some suitable material, such as wood or plastic has a journal pin 11 extending through the bore 10' thereof. An enlarged head 12 of suitable configuration is provided on the upper end of the pin 11 to facilitate handling of the spool and the lower end projects beyond the spool and is pointed, as at 13. The pointed end may include three prongs to provide a fixed anchor and a more stable and secure mounting when the spool is arranged on a chart, as will presently be described, although other pointed end forms may be used. A retractable coil spring 14 is suitably arranged in the bore 10' and is connected to the pin 11.

The spool 10 and journal pin 11 are housed within a cylindrical protective casing 15 with the pin projecting through the closed ends thereof, and flat washers 16–16' are arranged on the ends of the spool. A thread or cord 17 or some suitable material, such as cotton or plastic, is wound on and anchored to the spool 10 and projects through an opening 18 in the side wall of casing 15. Thus, the spool will be caused to rotate relative to the pin 11 and casing 15 during the withdrawal and retraction of the cord 17, in an obvious manner.

A pin 20 is attached, as at 21, to the free end of cord 17, and the upper end of the pin may be headed, as at 22, and have the same general configuration as head 12 on journal pin 11. The lower end of pin 20 may be pointed also in the same manner as pin 11 and may have a washer or suitable other type stop 24 spaced from the pointed end to limit its penetration into a conventional navigation chart 25 arranged on the cork surface of a conventional plotting board 26.

It will be understood that the use of two of the hereinbefore described spools and cords having pins thereon will be required when a pilot-navigator desires to determine the position of a moving vehicle.

Figure 3:
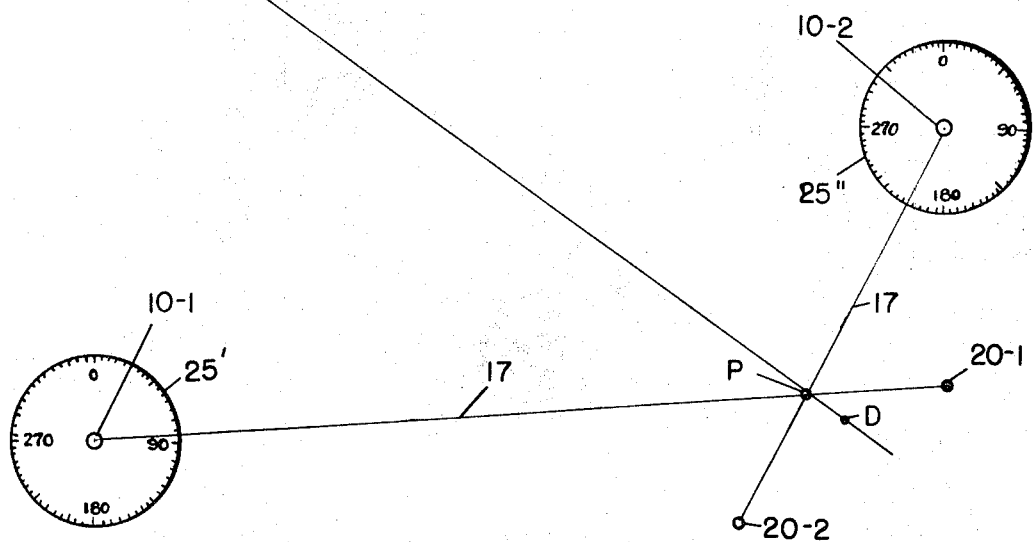
FIG. 3 is an illustration of the use of the invention as a plotting device.

The use and operation of the plotting device is illustrated in FIG. 3. Assuming that it is desired to travel a 300° course from departure point D on chart 25 to an arrival point A thereon, and to pin point a location from two omniranges for the vehicle's location on the chart. The pointed end 13 of one journal pin 11 of one spool 10–1 is pushed into the chart and the cork surface of the plotting board 26 therebeneath at the center point of an omnirange 25' thereon which is the position of a radio transmitting station which transmits direction bearings to be received on the vehicle's radio, and the pointed pin 20 on the end of cord 17 is pushed into the chart at the point 20–1 on the chart where the direction beam is received. Thus, the card 17 will be unreeled from the spool 10 and will provide a straight line between the points 10–1 and 20–1. Similarly, the pointed end of the journal pin of the other spool will be pushed into the chart at the center point 10–2 of a second omnirange 25'' thereon, or the position of another radio beam transmitting station. Thus, the second direction beam will also be plotted by the cord from the second spool 10–2 and inserting the pin thereon into the chart at the point 20–2 so that the cord will extend in a straight line therebetween. The point P where the two cords intersect will indicate the position of the aircraft or other moving vehicle on the navigation chart.

When the desired reading has been obtained, the pins on the ends of the cords may be removed from the surface of the chart and the cords retracted by springs 14 onto their respective spools and casings, after which the spools may be readily removed and stored in readiness for their next use, in an obvious manner, which, of course, will leave the chart surface clear and unmarked.

From the foregoing, it will be understood that the spools and associted anchoring means are adpted for use with the usual conventional charts commonly used for navigation purposes in air-craft and other vehicles equipped with standard and conventional radio equipment for receiving direction beams from transmitting stations, and the use thereof is not to be limited to any specific form of chart and/or plotting board.

While a preferred form of triangulation device has been shown and its method of use described, it is to be understood that various changes and improvements may be made therein without departing from the scope of the appended claim.

What I claim is:

1. In a navigation aid for plotting a positional fix on a chart including known direction beam transmitting stations, the combination including a pair of cylindrical casings having closed ends, fulcrum pin means in said casings and projecting through the closed ends thereof, spool means housed within said casings and journalled on said pin means, anchoring means on one end of said pin means and headed means on the opposing ends thereof, retractable spring means in said spool means and attached to said pin means, thread-like media retractably wound on said spool means and extending through openings in said casings, said media having pointed anchoring means on the free ends and headed means on the opposing ends thereof, whereby said encased spool means are anchored to the chart at said stations and the thread-like media unreeled from the reels during rotation on said pins along straight lines in accordance with directional signals and anchored to the chart so that their point of intersection will indicate a navigation position without otherwise marking the chart after which said casing and spool means are removed therefrom for reuse when plotting another position.

References Cited
UNITED STATES PATENTS

| | | | |
|---|---|---|---|
| 1,684,566 | 9/1928 | Winkler | 33—137 |
| 2,595,315 | 5/1952 | Weihe. | |
| 3,139,687 | 7/1964 | Hamer | 35—7 |
| 3,387,372 | 6/1968 | Sabadishin. | |

OTHER REFERENCES

Ronald Keen: "Wireless Direction Finding and Directional Reception," 1922, 2nd ed., pp. 198 and 199.

WILLIAM D. MARTIN, Jr., Primary Examiner

U.S. Cl. X.R.

33—138